United States Patent [19]

Hintze-Brüning et al.

[11] Patent Number: 5,407,995
[45] Date of Patent: Apr. 18, 1995

[54] AQUEOUS COATING COMPOSITION, IN PARTICULAR FOR THE COATING OF VENEER FILMS AND CONTINUOUS EDGES AND PROCESSES FOR THE COATING OF VENEER FILMS AND CONTINUOUS EDGES

[75] Inventors: Horst Hintze-Brüning; Joachim Roll, both of Münster, Germany

[73] Assignee: BASF Lacke + Farben Aktiengesellschaft, Munster, Germany

[21] Appl. No.: 969,275

[22] PCT Filed: Jul. 31, 1991

[86] PCT No.: PCT/EP91/01435
§ 371 Date: Mar. 18, 1993
§ 102(e) Date: Mar. 18, 1993

[87] PCT Pub. No.: WO92/02591
PCT Pub. Date: Feb. 20, 1992

[30] Foreign Application Priority Data

Aug. 4, 1990 [DE] Germany .................. 40 24 835.6

[51] Int. Cl.$^6$ .................. C08L 51/00; C08L 67/00
[52] U.S. Cl. .................. 524/539; 427/284; 427/285; 427/393; 428/481; 428/526; 428/530; 525/443
[58] Field of Search .................. 427/393, 284, 285; 524/539; 525/443; 428/481, 526, 530

[56] References Cited

U.S. PATENT DOCUMENTS 4,208,488 6/1980 Kraft et al. .................. 427/386 X
4,331,717 5/1982 Wenzel et al. .................. 427/389 X Primary Examiner—Michael Lusignan

[57] ABSTRACT

The present invention relates to acid-curing aqueous coating compositions, in particular for the coating of veneer films and continuous edges, containing an amino resin and a hydroxyl-containing polyester.

17 Claims, No Drawings

AQUEOUS COATING COMPOSITION, IN PARTICULAR FOR THE COATING OF VENEER FILMS AND CONTINUOUS EDGES AND PROCESSES FOR THE COATING OF VENEER FILMS AND CONTINUOUS EDGES

The present invention relates to aqueous coating compositions, in particular for the coating of veneer films and continuous edges, containing a coating component I, which comprises A) one or more water-dilutable melamine and/or urea resins, B) one or more hydroxyl-containing polyesters and C) if desired, pigments and/or fillers and, if desired, customary auxiliaries and additives and D) if desired, diluents, and a coating component II which contains an acid curing catalyst.

The invention also relates to processes for the coating of veneer films and continuous edges, using these aqueous coating compositions.

Impregnated papers which, when pressed onto boards, represent a preparative treatment in terms of priming (base film) or often also have a decorative effect (decorative film), have been well established in the furniture and board-making industry for a long time. After being pressed onto chipboards or hardboards, the films must be overcoated.

This additional operating procedure is unnecessary when a veneer film is used which is already coated by the film producer, following impregnation. The veneer films and continuous edges (for the continuous coating of edges) thus obtained are delivered to the furniture and board-making industry in the form of rolls, where they are glued onto substrates, such as, for example, chipboards or hardboards, by applying heat and/or pressure. This gives surfaces which usually do not need to be further coated, i.e. can be further processed as pressed.

German Offenlegungsschrift 2,316,158 has disclosed aqueous acid-curing two-component coatings based on etherified amino resins and polyester resins, which are also used for the coating of films for the furniture industry. In these two-component coatings, linear and/or branched polyesters having a molecular weight between 200 and 6000 and an OH number of up to 450 mg of KOH/g are used. These polyesters are prepared in the usual manner by reacting conventional dicarboxylic acids with conventional alcohols carrying two or more hydroxyl groups.

The coating agents described in German Offenlegungsschrift 2,316,158 are distinguished by rapid curing and high hardness, scratch resistance and stackability of the resulting coating, but have the disadvantage of a high formaldehyde emission of veneer films and continuous edges coated with these coatings. However, since the legal requirements with respect to formaldehyde emission of veneer films used in the furniture industry become ever more stringent, there is a very high demand for veneer films having less formaldehyde emission. Another disadvantage is the high plasticizer content of these coating agents, which is necessary for achieving good adhesion of the paints on the film and which can also lead to emissions under the drying conditions customary in practice or to slow emission from the paint film.

The development of special, water-repellant pore-leaving printing inks also makes available veneer films having a three-dimensional pore structure, which constitute an excellent imitation of a wood veneer (cf., for example, German Offenlegungsschrift 3,247,677, German Offenlegungsschrift 3,314,610 and German Offenlegungsschrift 3,024,391).

These veneer films having a three-dimensional pore structure are prepared by coating the films printed with the water-repellant pore-leaving printing ink with an aqueous acid-curing paint which, apart from a melamine resin, also contains a water-dilutable polyester resin or an acrylate resin or an ethoxylated glycerol derivative. However, these aqueous coating agents too have the disadvantage that, apart from solvents and water, other coating components, such as plasticizers, polyols or degradation products thereof, are also emitted under the drying conditions customary in practice.

Moreover, the impregnated and coated decorative papers described in the examples of German Offenlegungsschrift 3,314,610 have an excessively high formaldehyde emission of more than 3.5 mg/hm$^2$, determined according to DIN 52 368. Finally, the decorative papers coated with these coating agents have only insufficient resistance to household chemicals, such as, for example, dissolved instant coffee (determined according to DIN 68 861, Part 1).

Furthermore, in the not yet published patent application DE 3,905,268, aqueous, acid-curing two-component coatings for the coating of veneer films and continuous edges are disclosed, which, apart from water-dilutable amino resins, polyols and possibly a self-crosslinking aqueous polyacrylate dispersion, contain one or more fillers having an average particle size of 0.015 to 10 μm, a maximum particle size of ≦40 μm and a density of ≦2.9 g/cm$^3$. However, the two-component coatings described there are, depending on the binding agent used, not suitable for producing a three-dimensional surface structure.

Finally, in the not yet published patent application DE 4,001,672, aqueous, acid-curing two-component coatings for the coating of veneer films and continuous edges are disclosed, which, apart from an amino resin, contain a hydroxyl-containing polyester. The polyesters used were prepared by using 50 to 100 mol %, relative to the total amount of carboxylic acid, of at least one olefinically unsaturated, aliphatic dicarboxylic acid and 5 to 30 mol %, relative to the total amount of alcohol, of at least one polymer glycol having 2 to 4 C atoms per glycol segment and a number-average molecular weight between 300 and 1000. Nor are these two-component coatings suitable for producing a three-dimensional surface structure.

The present invention is based on the object of providing aqueous coating compositions for the coating of veneer films, continuous edges and wood materials which, in combination with special printing inks usually used for this purpose, make it possible to obtain three-dimensional surface structures. Moreover, these aqueous coating compositions should be dryable at low emission levels, i.e. under the drying conditions customary in practice no further coating components other than water, solvents and the condensation cleavage products released during crosslinking should be emitted. It is particularly important that the formaldehyde emission of these coating compositions should not exceed a value of 3 5 mg/h m$^2$, determined by DIN 52 368, not only after coating onto a film or edge but also after gluing of these coated films or edges onto a chipboard which is low in formaldehyde (emission class E1). A further requirement is that the veneer films, continuous edges and wood materials coated with these aqueous coating compositions have good wear properties even without further overcoating, such as, for example, good resistance to various reagents, for example foodstuffs, such as instant coffee and the like, such as is required in DIN 68 861, group A.

This object is surprisingly achieved by aqueous coating compositions, containing a coating component I, which comprises A) one or more water-dilutable melamine and/or urea resins, B) one or more hydroxyl-containing polyesters and C) if desired, pigments and/or fillers and, if desired, customary auxiliaries and additives and D) if desired, diluents, and a coating component II which contains an acid curing catalyst.

The polyesters used in these coating compositions as component B were prepared from a) 30 to 50 mol % of a mixture comprising $a_1$) 50 to 100 mol % of at least one saturated, aliphatic dicarboxylic acid, $a_2$) 0 to 50 mol % of at least one olefinically unsaturated, aliphatic dicarboxylic acid, $a_3$) 0 to 50 mol % of at least one aromatic dicarboxylic acid, $a_4$) 0 to 50 mol % of at least one diisocyanate and b) 70 to 50 mol % of a mixture comprising $b_1$) 10 to 60 mol % of at least one monomeric and/or oligomeric glycol having 2 to 4 C atoms per glycol segment and a number-average molecular weight of less than or equal to 200, $b_2$) 10 to 60 mol % of at least one diol having 4 to 10 C atoms per molecule, with the exception of the glycols used as component $b_1$, $b_3$) 0 to 70 mol % of at least one polyol having on average 3 to 6 OH groups per molecule and a number-average molecular weight of less than or equal to 1000, with the proviso that not only the sum of the proportions of components $a_1$ to $a_4$ but also the sum of the proportions of components $b_1$ to $b_3$ as well as the sum of the proportions of components a and b are in each case by themselves 100 mol % and polyesters B have an OH number of 200 to 1000 mg of KOH/g, preferably 200 to 800 mg of KOH/g.

The invention also relates to processes for the coating of veneer films and continuous edges, using these aqueous coating compositions, and to the veneer films and continuous edges obtained by this process and to their use for gluing onto chipboards or hard-boards.

In what follows, first the individual components of the aqueous coating composition according to the invention will now be illustrated in more detail.

The melamine resins (component A) used in coating component I are generally known melamine/aldehyde reaction products which are usually etherified. The water dilutability of the melamine resins depends, apart from the degree of condensation, which should be as low as possible, on the etherifying component, only the lowest members of the alkanol series resulting in water-soluble condensation products. Hexamethoxymethyl-melamine resins have the greatest importance. When solubilizing agents are used, it is also possible to disperse butanol-etherified melamine resins in aqueous phase.

Examples of suitable melamine resins are the water-soluble melamine resins which are commercially available under the tradename Cymel® 325, 327, 303 (manufacturer: Dyno Cyanamid, Düsseldorf), Luwipal® 072, 066, LR 8839, LR 8789 (manufacturer: BASF AG, Ludwigshafen), Beetle® BE 3745 and BE 370 (manufacturer: BIP Chemicals Ltd., Great Britain), Maprenal® MF 900, 904 and 910 (manufacturer: Hoechst AG), Cibamin® (Ciba AG, Switzerland), Resimene® 714, 745 and 747 (Monsanto). Hexamethoxymethyl-melamine resins, such as, for example, Cymel® 325, 327, 303; Luwipal® 066 and Maprenal® MF 900 are preferably used.

The urea resins (component A) used in coating component I are also known water-dilutable urea/aldehyde reaction products, preferably water-dilutable urea formaldehyde reaction products. Examples of suitable resins are the plasticized or unplasticized urea/formaldehyde reaction products commercially available under the tradename Dynomin® UM 15 (manufacturer: Norsk Spraengstof Industrie, Norway), Resamin® VHW 3525 (manufacturer: Hoechst AG) or Plastopal® (manufacturer: BASF AG, Ludwigshafen).

These melamine and urea resins can be used individually or in a mixture as component A. The two-component coating according to the invention usually contains component A in an amount of 15 to 70% by weight, preferably 30 to 55% by weight, in each case relative to the total weight of coating component I, i.e. without curing component II.

In order to crosslink the melamine and/or urea resins (component A), the aqueous coating compositions usually contain in addition 10 to 50% by weight, preferably 20 to 35% by weight, in each case relative to the total weight of coating component I, of one or more hydroxyl-containing polyesters (component B).

According to the invention, these polyesters are made up of a) 30 to 50 mol %, preferably 30 to 40 mol %, of dicarboxylic acids and b) 70 to 50 mol %, preferably 70 to 60 mol %, of di- and/or polyols, dicarboxylic component a being a mixture comprising $a_1$) 50 to 100 mol %, preferably 70 to 100 mol %, of at least one saturated, aliphatic dicarboxylic acid, $a_2$) 0 to 50 mol %, preferably 0 to 30 mol %, of at least one olefinically unsaturated, aliphatic dicarboxylic acid, $a_3$) 0 to 50 mol %, preferably 0 to 30 mol %, of at least one aromatic dicarboxylic acid and $a_4$) 0 to 50 mol %, preferably 0 to 30 mol %, of at least one diisocyanate and di- and/or polyol component b being a mixture comprising $b_1$) 10 to 60 mol %, preferably 20 to 45 mol %, of at least one monomeric and/or oligomeric glycol having 2 to 4 C atoms per glycol segment and having a number-average molecular weight of less than or equal to 200, $b_2$) 10 to 60 mol %, preferably 20 to 45 mol %, of at least one diol having 4 to 10 C atoms per molecule, with the exception of the glycols used as component $b_1$, $b_3$) 0 to 70 mol %, preferably 30 to 50 mol %, of at least one polyol having on average 3 to 6 OH groups per molecule and having a number-average molecular weight of less than or equal to 1000 with the proviso that not only the sum of the proportions of components $a_1$ to $a_4$ but also the sum of the proportions of components $b_1$ to $b_3$ as well as the sum of the proportions of components a and b are in each case by themselves 100 mol % and polyesters B have an OH number of 200 to 1000 mg of KOH/g, preferably 200 to 800 mg of KOH/g.

Suitable components $a_1$ are any saturated, aliphatic dicarboxylic acids having in general 4 to 32 C atoms, preferably having 4 to 10 C atoms. A mixture comprising these aliphatic dicarboxylic acids is preferably used. Examples of suitable saturated, aliphatic dicarboxylic acids are malonic acid, succinic acid, glutaric acid, adipic acid, pimelic acid, suberic acid, azelaic acid, sebacic acid and longer-chain dicarboxylic acids, such as, for example, dimeric fatty acids.

Adipic acid, succinic acid and glutaric acid are preferably used. Particularly preferably, a mixture of these three carboxylic acids is used. These acids can be used in the form of the free acids or esterifiable derivatives thereof (for example anhydrides), or transesterifiable derivatives thereof (for example dimethyl esters).

Suitable components $a_2$ are any olefinically unsaturated aliphatic dicarboxylic acids, such as, for example, maleic acid, fumaric acid, itaconic acid and citraconic acid. Maleic acid is preferably used. These acids can be used in the form of the free acids or esterifiable derivatives thereof (for example anhydrides).

Suitable components $a_3$ are any aromatic dicarboxylic acids, for example phthalic acid, isophthalic acid, terephthalic acid, naphthalene-dicarboxylic acids, and the like. Aromatic dicarboxylic acids which are not substituted at the ortho-position are preferably used. Phthalic acid and isophthalic acid and mixtures thereof are particularly preferably used. These acids can be used in the form of the free acids, esterifiable derivatives thereof (for example anhydrides) or transesterifiable derivatives thereof (for example dimethyl esters).

Suitable components $a_4$ are not only aromatic but also aliphatic diisocyanates, such as, for example, toluylene diisocyanates, 4,4-diphenylmethane diisocyanate, 4,4-dicyclohexylmethane diisocyanate, isophorone diisocyanate, hexamethylene diisocyanate, xylylene diisocyanate, methylcyclohexyl diisocyanate, trimethylhexamethylene diisocyanate and 1,6-hexane diisocyanate.

Examples of suitable monomeric or oligomeric glycols having 2 to 4 C atoms per glycol segment and number-average molecular weights $\leq 200$ (component $b_1$) are, for example, ethylene glycol, 1,2- and 1,3-propyleneglycol, 1,3-butylene glycol, 1,4-butanediol, diethylene glycol, triethylene glycol, tetraethylene glycol, and the like. Monomeric or oligomeric linear glycols having 2 C atoms per glycol segment and number-average molecular weights $\leq 200$ are preferably used. Triethylene glycol is particularly preferred.

Suitable components $b_2$ are diols having 4 to 10 C atoms per molecule, with the exception of the glycols used as component $b_1$. Branched, saturated, aliphatic and/or cycloaliphatic diols are preferably used. Particular preference is given to hyroxyalkyl-substituted cyclohexane and cyclohexane derivatives. Examples of suitable diols as component $b_2$ are 1,6-hexanediol, neopentylglycol, 2,2,4-trimethyl-1,3-pentanediol, 1,4-dimethylolcyclohexane and neopentylglycol hydroxypivalate.

1,4-Dimethylolcyclohexane is particularly preferably used.

Suitable components $b_3$ are polyols having on average 3 to 6 OH groups per molecule and having a number-average molecular weight of less than or equal to 1000, preferably less than or equal to 400. Preference is given to the use of polyols having on average 3 to 4 OH groups and particular preference to triols. Examples of suitable polyols are glycerol, trimethylolpropane, trimethylolethane, pentaerythritol, ditrimethylolpropane, diglycerol and derivatives thereof obtainable by alkoxylation, preferably ethoxylation and propoxylation, and mixtures of these compounds.

These hydroxyl-containing polyesters can be prepared by customary processes (cf., for example, Houben Weyl, Methoden der organischen Chemie (Methods of organic chemistry), 4th edition, Volume 14/2, Georg Thieme Verlag, Stuttgart 1961). They have hydroxyl numbers between 200 and 1000 mg of KOH/g, preferably 200 to 800 mg of KOH/g and in general number-average molecular weights between 250 and 700, preferably between 300 and 600. The polyesters used are usually liquid and in general have very low viscosity.

Coating component I can furthermore contain an aqueous self-crosslinking polyacrylate dispersion. These aqueous self-crosslinking polyacrylate dispersions are usually used in an amount of 0–10% by weight, preferably 2 to 5% by weight, in each case relative to the total weight of coating component I. The polyacrylate resins contain as the groups enabling self-crosslinking carboxamide derivatives having the general structure formula

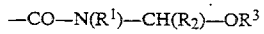

$$-CO-N(R^1)-CH(R_2)-OR^3$$

in which $R^1$ is an H atom or a $-CH(R_2)-OR^3$ grouping, $R^2$ is an H atom or a $-COOR^4$ group, $R^3$ is an H atom or a hydrocarbon radical containing 1 to 10 C atoms, preferably a methyl, ethyl, (iso)propyl or (iso)butyl radical, $R^4$ is an alkyl radical having 1 to 5 C atoms.

The $-CO-N(R^1)-CH(R^2)-OR^3$ group can have been introduced into the polyacrylate molecules either via a monomer incorporated by polymerization or via a polymer-analogous reaction. Preference is given to $-CO-N(R^1)-CH(R^2)-OR^3$ groups in which $R^1$ and $R^2$ are hydrogen atoms and $R^3$ is a hydrogen atom or an alkyl radical having 1 to 4 C atoms, preferably methyl, ethyl, (iso)propyl or (iso)butyl.

Apart from the carboxamide derivatives described above, the self-crosslinking polyacrylate resins can also contain carboxyl groups. A person skilled in the art can determine by means of a few orienting tests which carboxyl group content should be chosen for a given problem.

Apart from the carboxamide derivatives and carboxyl groups, the polyacrylate resin can also contain further functional groups, such as, for example, hydroxyl groups or free amido groups.

The aqueous acrylate dispersions which can be used can be prepared in accordance with generally known methods by copolymerization of (meth)acrylic esters, preferably methyl, ethyl, propyl or butyl (meth)acrylates, the corresponding (meth)acrylamide derivatives and, if desired, an appropriate amount of monomers carrying carboxyl groups and containing a polymerizable double bond, for example fumaric or maleic acid, preferably (meth)acrylic acid with the possible additional use of small amounts of further monomers, such as, for example, vinyl acetate, hydroxyalkyl (meth)acrylates, styrene, (meth)acrylamides, and the like. Dispersions having the following characteristic data are preferably used:

Solids content: 40 to 60% by weight, preferably 40 to 50% by weight, relative to the total weight of the aqueous polyacrylate dispersion.

Average particle diameter: 0.1 to 0.5 μm, preferably 0.1 to 0.3 μm.

Minimum film formation temperature (MFT): 0° to 70° C., preferably between 20° and 60° C.

Viscosity: 200 to 5,000 mPas, preferably 200 to 1,000 mPas and pH value: 2 to 10, preferably greater than 7.

For proper adjustment of the advantageous processing viscosity, both coating component I and II can additionally contain liquid diluents. Suitable liquid diluents are composed of at least 50% by weight, preferably 95 to 100% by weight, of water, relative to the sum of the weight proportions of all liquid diluents. In addition to them, organic solvents, such as, for example, mono- or polyhydric alcohols, ethers, esters and ketones, such as N-methylpyrrolidone, butanol, isopropanol, ethanol, ethyl- and butylglycol and acetates thereof, butyldiglycol, ethylene glycol dibutyl ether, ethylene glycol diethyl ether, diethylene glycol dimethyl ether, cyclohexanone, methyl ethyl ketone, acetone, isophorone, propylene glycol or mixtures thereof can also be present. The amount of diluent used is in general, in the case of coating component I, 0 to 20% by weight, relative to the total weight of all components of coating component I. Coating component II usually contains 30 to 80% by weight, of diluent, relative to the total weight of coating component II.

The curing component (coating component II) present in the aqueous coating composition according to the invention is a water-dilutable acid, an aqueous solution thereof or an acid blocked with amines or amino alcohols or an aqueous solution thereof. Suitable water-dilutable acids are phosphoric acid, maleic acid, hydrochloric acid, para-toluenesulfonic acid and derivatives thereof, napthalenesulfonic acid and derivatives thereof and the corresponding reaction products of these acids with amines or amino alcohols, such as, for example, an aqueous solution of the ammonium salt of p-toluenesulfonic acid. The amines or amino alcohols used are, for example, morpholine, dimethylethanolamine, aminomethylpropanol and aminoethylpropanediol. When formulating the coating compositions according to the invention as single-component system, the sulfonic acids are used in blocked form, for example as ammonium salt. Furthermore, curing component II can contain substances which undergo addition reactions with formaldehyde, such as, for example, urea, thiourea, ethyleneurea or dicyandiamide. These substances are usually used in an amount of 0 to 40% by weight, relative to the total weight of coating component II.

para-Toluenesulfonic acid, hydrochloric acid and phosphoric acid are preferably used, para-Toluenesulfonic acid being particularly preferred. The use of solutions of para-Toluenesulfonic acid in acid-resistant acrylate dispersions as curing component has the advantage that the surface properties is [sic] improved, in particular that excessive surface tension is reduced. In order to obtain uniform distribution of this curing catalyst in the coating compositions, the acids or their derivatives are preferably used as a solution in water or a water-dilutable solvent.

Before application, coating components I and II are mixed in such a ratio that usually 0.5 to 50 parts by weight of the pure curing component II, i.e. coating component II without diluent, are present per 100 parts by weight of coating component I comprising components A to C (i.e. without diluent). The pot life (time during which the mixture can be processed) of the mixture obtained depends, for example, on the type and concentration of the curing component and the processing temperature. In accordance with the requirements of the film producers, the pot lives of the mixtures are more than 24 h. In contrast, coating components I and II are separately stable for more than 2 months.

It is also possible for customary auxiliaries and additives to be present in the aqueous coating compositions according to the invention in the usual amounts, such as, for example, 0 to 10% by weight, preferably 0 to 3% by weight, of flatting agents (silica derivatives), 0 to 2% by weight, preferably 0.5 to 1.0% by weight, of waxes (for example polyethylene and polypropylene waxes), 0 to 2.0% by weight, preferably 0.5 to 1.0% by weight, of emulsifier (ethoxylated alkylphenols, ethoxylated fatty acids), 0 to 2.0% by weight, preferably 0.5 to 1.0% by weight, of antifoams and 0 to 10% by weight, preferably 0 to 3% by weight, of further additives, such as plasticizers (ethoxylated glycerol), thixotropic agents (polyacrylates, polyurethanes, cellulose derivatives), flow-improving and wetting agents (sodium salts of polyacrylates) and film-forming auxiliaries (phosphoric esters, glycols). The percentages by weight given refer in each case to the total composition of coating component I, i.e. including any diluents present.

Coating components I and II are prepared in the usual manner by mixing the components. In some cases, it may be advisable to dissolve a component, if not present in liquid form, first in a solvent and to mix this solution with the remaining components.

The aqueous coating composition described above can also be pigmented, in which case coating component I in general contains 0 to 40% by weight, preferably 0 to 30% by weight, in each case relative to the total weight of coating component I, of pigment. The optimum pigment content in each case depends on the desired hiding power and the pigment used and can be determined by the average person skilled in the art by means of routine tests which can be easily carried out.

The pigments can be incorporated either by milling the various pigments together with the binding agent or coating component I is added to an aqueous pigment paste.

The pigments used can be any inorganic and organic pigments which are not only water-wettable but also not sublimable at the temperatures used and whose color does not change under the process and pH conditions.

Examples of suitable pigments are titanium dioxide of the rutile type, yellow, red and black iron oxides, carbon black and phthalocyanine. Titanium dioxide is preferably used as pigment.

Furthermore, if necessary, fillers, such as, for example, silica, various talc, mica and kaolin types and other aluminum- and/or magnesium-containing silicates, barium sulfate, and the like, can also be added to the aqueous two-component coatings according to the invention. The fillers are used in the usual amounts, preferably between 3 to 7% by weight, relative to the total weight of coating component I.

Coating of the veneer films and continuous edges with the aqueous two-component paints according to the invention is carried out using apparatuses especially developed for this purpose. Available coating or metering devices for the paint are print rolls or wire-wound doctor blades. The amount of paint applied is usually between 5 to 50 g/m² at a wet film thickness of 10 to 80 μm. For drying the paint, hot-air drying tunnels, so-called convectors, or IR radiators or combinations of the two or hot rolls (calenders) are usually used. After drying, the paper web is wound into a roll and delivered in this form to the furniture industry.

As soon as the mixture comprising coating component (I) and curing component (II) has been applied and brought to a temperature of 140° to 210° C., it is cured within 10 to 20 seconds without bubble formation to such an extent that the resulting coating surfaces survive without damage the further process steps, in particular the increasingly more rigorous pressing conditions, without showing block properties or discolorations.

The aqueous coating compositions in question are also suitable for coating wood substrates, such as, for example hardboards, chipboards and wood materials.

The aqueous two-component paints according to the invention, in combination with hydrophobic pore-leaving printing inks for printing decorative papers, make it possible to imitate a genuine wood veneer by leading, as described, for example, in German Offenlegungsschrift 3,024,391, to a three-dimensional surface structure when the printed decorative paper is coated.

The films and continuous edges prepared by using the two-component paints according to the invention have in particular the advantage that they have a very low formaldehyde emission of less than 3.5 mg/hm². They also show an extremely low formaldehyde emission of ≦3.5 mg/hm² (emission determined in each case according to DIN 53268) in a composite with chipboards, in particular those of emission class E1.

A further advantage is that the coatings prepared by using the two-component paints according to the invention can be dried at low emission levels and, as a result of which they result in films having good wear properties, in particular good resistance to a variety of reagents (determined according to DIN 68 861, group A), such as, for example, dissolved instant coffee.

The present invention will now be illustrated in more detail by way of exemplary embodiments. Unless expressly stated otherwise, all parts and percentages given are by weight.

1. PREPARATION OF HYDROXYL-CONTAINING POLYESTERS

The hydroxyl-containing polyesters 1 to 3 and, for comparison, the polyesters C1 to C11 are prepared by the usual method from the components listed in Table 1 by heating the individual components together with 0.05% by weight of dibutyltin oxide as transesterification or esterification catalyst and, in the case of polyesters containing maleic acid (anhydride), with 0.1% by weight of hydroquinone as stabilizer in a reactor equipped with stirrer, nitrogen inlet and heated packed column at 200° C. for 6 hours. The water of reaction formed, in the case of using maleic acid (anhydride) (Comparative Experiments 1, 2, 3, 5, 6, 8 and 9) or methanol, in the case of using the dimethyl ester of succinic, glutaric and adipic acid (Examples 1 to 3 and Comparative Experiments 4, 7, 10 and 11) is distilled off. The esterification or transesterification is continued at 200° C. until the characteristic data listed in Table 2 are reached.

2. PREPARATION OF CURING COMPONENT (COATING COMPONENT II)

2.1 Preparation of curing component 1

40 parts of para-toluenesulfonic acid are dissolved in 60 parts of water with stirring.

2.2 Preparation of curing component 2

40 parts of para-toluenesulfonic acid are dissolved in 45 parts of water with stirring. A mixture of 15 parts of aminomethoxypropanol/water (2:1) is added to the solution.

EXAMPLE 1

First, a coating component I-1 is prepared in the following manner:

40 parts of a 100% pure hexamethoxymethylmelamine resin having a viscosity of 3000 mPas (21° C.), 3 parts of methoxypropanol, 48 parts of polyester polyol 3, 0.5 part of a micronized polypropylene wax (melting point 140° C.), 5.5 parts of water and 3.0 parts of precipitated silica having an average particle size of 4 μm are mixed with stirring.

10 parts of curing component I are added with stirring to 100 parts of the coating component I-1 thus prepared. The film topcoat thus obtained is brought to a viscosity of 20 s in the 4 mm viscosity cup (DIN 53 211) with deionized water and then applied to a white impregnated specimen with a weight of 75 g/m² by means of a wire-wound doctor blade (wet film thickness 30 μm) and then dried at 160° C. in a jet tunnel for 20 s. The same coating was applied to a brown pre-impregnated specimen (decorative oak, weight 60 g/m²), printed with a pore-leaving printing ink (described in German Offenlegungsschrift 3,314,610) by means of a wire-wound doctor blade (wet film thickness 20 μm) and then dried at 160° C. in a jet-drying tunnel for 20 s. The furniture films thus prepared were pressed onto a chipboard using a urea glue at 5 kp/150° C. within 30 s. The pore trace and the resistance to dissolved instant coffee (DIN 68861 Part 1 A) was (sic) evaluated by means of the specimens thus prepared. The results are shown in Tables 3 and 4. Evaluation of additional emissions in the form of smoke formation was carried out as follows: A white impregnated specimen (DIN A4 format) described above was coated by means of a wire-wound doctor blade with the paints mentioned (wet film thickness 30 μm) and placed in a drying cabinet without circulating air (temperature 180° C., inner volume 25 l). After 60 s, the door of the drying cabinet was opened and the smoke formation was evaluated, using an illuminated black wall (see Tables 3 and 4). Formaldehyde emission of the pre-impregnated specimens coated with the exemplary paints (wet film thickness 20 μm) was determined according to DIN 52368 (see Table 3).

EXAMPLE 2

First, a coating component I-2 is prepared as follows:

45 parts of the 100% pure hexamethoxymethylmelamine resin described in Example 1, 1 part of methoxypropanol, 7.5 parts of water, 0.5 part of the wax described in Example 1, 1 part of the silica described in Example 1 and 46 parts of the polyester polyol 2 are mixed with stirring. The further preparation of the film topcoat 2, the application and curing are carried out analogously to Example 1. The test results of the properties of the coated film are also shown in Table 3.

EXAMPLE 3

First, a coating component I-3 is prepared as follows:

62 parts of a water-dilutable melamine/formaldehyde resin substantially etherified with methanol (nonvolatile component 2h/125° C. 85%, viscosity at 23° C. 2.4–3.6 Pas), 3 parts of butylglycol, 20 parts of polyester polyol 2, 3 parts of a 35% strength polyethylene wax emulsion (pH 9, density-1 g/cm$^3$) and 2 parts of a surface-treated silica having a secondary particle size of 1–8 μm (SiO$_2$ content>87%) are mixed with stirring.

The further preparation of the film topcoat 3, the application and curing are carried out analogously to Example 1. The test results of the properties of the coated film are also shown in Tables 3 and 4.

EXAMPLE 4

First, a coating component I-4 is prepared as follows:

15 parts of the melamine resin described in Example 1, 38 parts of a 90% pure imino-containing methylated melamine/formaldehyde resin having a density of 1.18 g/cm$^3$ and a viscosity of 41–120 Poise, 30 parts of polyester polyol 1, 0.5 part of tributyl phosphate, 9 parts of water and 2.5 parts of amorphous silica having an average particle size of 3 μm are mixed with stirring. 5 parts of an aqueous, amido-containing, self-crosslinking anionic acrylate dispersion (average particle size 0.25 μm, viscosity at 23° C. 200 mPas, solids content about 50%) are then added to the mixture obtained with stirring.

The further preparation of the film topcoat 4, the application and curing are carried out analogously to Example 1. The test results of the properties of the coated film are shown in Table 3.

EXAMPLE 5

A film topcoat 5 is prepared analogously to Example 2, except that curing component 2 is used instead of curing component 1 as coating component II-5. The preparation of film topcoat 5, the application and curing are carried out analogously to Example 2. The test results of the properties of the coated film are shown in Table 3.

Comparative Examples 1 to 11

Various coating components I-C1 to I-C11 are prepared analogously to Example 3, except that 20 parts of polyester C1 to C11 are used instead of 20 parts of polyester 2.

The further preparation of the film topcoats, the application and curing are carried out analogously to Example 3. The test results of the properties of the coated films are shown in Table 4.

Comparative Example 12

Analogously to the example of paint I from German Offenlegungsschrift 3,314,610, a film topcoat C 12 is prepared as follows: First, a coating component I-C 12 is prepared as follows: 62.1 parts of Maprenal ® MF 920/95% pure (melamine resin, commercial product from Hoechst AG), 15.0 parts of Acronal ® 240 D/40% strength (acrylate resin, commercial product from BASF AG), 12.0 parts of 1,6-hexanediol/80% strength (commercial product from BASF AG), 2.5 parts of Syloid ® 166 (flatting agent based on silica, commercial product from Grace), 1.25 parts of Bentone ® paste EW/5% strength (commercial product from Kronos Titan), 3.0 parts of methoxybutanol, 0.5 part of Surfynol ® TG (pigment wetting agent from Air Products U.S.A.) and 0.75 part of Etingal A/10% strength solution (antifoam based on phosphoric ester, commercial product from BASF AG) are mixed with stirring. 5.3 parts of a 50% strength solution of para-toluenesulfonic acid in water are added with stirring to 100 parts of the coating component I-C 12 thus prepared. Application and curing of the film topcoat are carried out as described in Example 1. The test results of the properties of the coated film are shown in Table 4.

Comparative Example 13

Analogously to Example 2 of Patent Application DE 3,905,268, which is not a prior publication, a film topcoat is prepared. For this purpose, first a coating component I-C 13 is prepared as follows:

30 parts of a water-dilutable, elastic urea/formaldehyde resin (acid number <3 mg of KOH/g) and 20 parts of a water-dilutable melamine/formaldehyde resin substantially etherified with methanol (solids content 80–85%, viscosity at 23° C. 1.6–2.4 Pas), 35 parts of a water-dilutable, partly unsaturated polyester polyol (OH number 420 mg of KOH/g, acid number<5 mg of KOH/g), 6 parts of a kaolin (average particle size of 0.80 μm, maximum particle size 35 μm, density 2.6 g/cm$^3$), 2 parts of a talc (average particle size of 5 μm, maximum particle size 25 μm, density 2.8 g/cm3), 2 parts [lacuna] and 1 part of a nonionic emulsifier (acrylic polyglycol ether, density 1.12 g/cm$^3$) are mixed with stirring.

Further preparation of the film topcoat, application and curing are carried out analogously to Example 3. The test results of the properties of the coated film are shown in Table 4.

TABLE 1

| Composition of the polyesters 1 to 3 and C1 to C11 in mol | | | | | | | | | | | | | | |
| --- | --- | --- | --- | --- | --- | --- | --- | --- | --- | --- | --- | --- | --- | --- |
| | 1 | 2 | 3 | C1 | C2 | C3 | C4 | C5 | C6 | C7 | C8 | C9 | C10 | C11 |
| Maleic a.[1] | — | — | — | 1.0 | 1.0 | 1.0 | — | 1.0 | 1.0 | — | 1.0 | 1.0 | — | — |
| Succ. a.[2] | 0.25 | 0.25 | 0.25 | — | — | — | 0.25 | — | — | 0.25 | — | — | 0.25 | 0.25 |
| Glutar. a.[3] | 0.5 | 0.5 | 0.5 | — | — | — | 0.5 | — | — | 0.5 | — | — | 0.5 | 0.5 |
| Adip. a.[4] | 0.25 | 0.25 | 0.25 | — | — | — | 0.25 | — | — | 0.25 | — | — | 0.25 | 0.25 |
| TBG[5] | 0.5 | 1.0 | 0.25 | 2.0 | — | 1.0 | 1.0 | 1.5 | 1.0 | — | 2.0 | 1.5 | 2.0 | — |
| Gly[6] | 1.0 | — | 1.25 | — | 2.0 | 1.0 | 1.0 | — | — | 2.0 | — | — | — | — |
| DMC[7] | 0.5 | 1.0 | 0.5 | — | — | — | — | 0.5 | — | — | — | — | — | 2.0 |
| TMPD[8] | — | — | — | — | — | — | — | — | 1.0 | — | — | — | — | — |

TABLE 1-continued

| | Composition of the polyesters 1 to 3 and C1 to C11 in mol | | | | | | | | | | | | | |
|---|---|---|---|---|---|---|---|---|---|---|---|---|---|---|
| | 1 | 2 | 3 | C1 | C2 | C3 | C4 | C5 | C6 | C7 | C8 | C9 | C10 | C11 |
| TEA[9] | — | — | — | — | — | — | — | — | — | — | — | 0.5 | — | — |

Explanations for Table 1
[1] Maleic acid
[2] Succinic acid
[3] Glutaric acid
[4] Adipic acid
[5] Triethylene glycol
[6] Glycerol
[7] 1,4-Dimethylolcyclohexane
[8] 2,2,4-Trimethyl-1,3-pentanediol
[9] Triethanolamine

TABLE 2

| | Characteristic data of polyesters 1 to 3 and C1 to C11 | | | | | | | | | | | | | |
|---|---|---|---|---|---|---|---|---|---|---|---|---|---|---|
| | 1 | 2 | 3 | C1 | C2 | C3 | C4 | C5 | C6 | C7 | C8 | C9 | C10 | C11 |
| Solids content (1 h/130° C.) | 86 | 78 | 82 | 82 | >95 | >95 | 83 | 87 | 81 | 88 | 85 | 85 | 78 | 81 |
| Acid number (mg of KOH/g) | <1 | <1 | <1 | <5 | <5 | <5 | <1 | <5 | 8 | <1 | <5 | <5 | <1 | <1 |
| OH number[1] (mg of KOH/g) | 500 | 290 | 570 | 300 | 850 | 520 | 500 | 300 | 300 | 800 | 260 | — | 290 | 290 |
| Mol. w.[1] (g/mol) | 330 | 390 | 320 | 380 | 270 | 320 | 340 | 380 | 370 | 280 | 430 | — | 390 | 380 |
| Viscosity (dPas)[2] | 4.4 | 2.0 | 5.6 | 2.2 | >10 | — | 1.8 | 3.5 | 2.2 | 1.8 | 1.3 | 5.0[3] | 0.7 | 6.5 |
| Degree of branching[1] (branch/kg) | 2.99 | 0 | 3.91 | 0 | 7.56 | 3.12 | 2.96 | 0 | 0 | 7.16 | 0 | — | 0 | 0 |

[1] Theoretical calculation, assuming 0% of loss in glycol and no side reactions
[2] Measured at 23% by the ICI plate/cone viscometer, 80% strength in butylglycol
[3] Measured as 60% strength in butylglycol

TABLE 3

| Coating agent | Pore trace | Smoking | Coffee test | HCHO [mg/hm$^2$] |
|---|---|---|---|---|
| Example 1 | 1 | 1 | 3 | 2.4 |
| Example 2 | 1 | 0–1 | 3 | 1.9 |
| Example 3 | 1 | 0 | 2–3 | 2.0 |
| Example 4 | 1 | 0 | 2–3 | 2.2 |
| Example 5 | 1 | 1 | 3 | 1.7 |

TABLE 4

| Coating agent | Pore trace | Smoking | Coffee test |
|---|---|---|---|
| Example 3 | 1 | 0 | 2–3 |
| Comparative example 1 | 1–2 | 5 | 5 |
| Comparative example 2 | 5 | 0 | 4 |
| Comparative example 3 | 3–4 | 5 | 4 |
| Comparative example 4 | 1 | 5 | 4–5 |
| Comparative example 5 | 3 | 5 | 5 |
| Comparative example 6 | 5 | 3 | 5 |
| Comparative example 7 | 5 | 5 | 4 |
| Comparative example 8 | 1 | 4 | 5 |
| Comparative example 9 | 3–4 | 3 | 5 |
| Comparative example 10 | 1 | 4 | 5 |
| Comparative example 11 | 3–4 | 3 | 2 |
| Comparative example 12 | 4–5 | 5 | 5 |
| Comparative example 13 | 4 | 3 | 2–3 |

Ratings: Pore: 1=very good, 5=complete wetting
Smoking: 0=no smoke formation, 5=very strong smoke formation
Coffee test: Ratings according to DIN 68861 Part 1

SUMMARY OF THE TEST RESULTS

A pore trace rated as very good or good (formation of a 3-dimensional surface structure) fulfills the requirements customary for such paint systems in practice. The resistance to chemicals was tested according to DIN 68 861, Part 1 A, using the example of instant coffee (as described in the standard). The coating agents according to the invention should at least reach the rating 3. Correlation of the smoking test carried out with the conditions prevalent in practice showed that coating agents which were there rated 0 or 1 fulfill the requirements.

From the results listed in Tables 3 and 4, it can be concluded that the coating agent compositions according to the invention not only lead to a very good pore formation (3-dimensional surface structure) but are also low in emissions under the baking conditions customary in practice and have a formaldehyde emission within the E1 limit.

Depending on the composition of the polyester polyols not according to the invention, which were used here, comparative examples 1–11 show either weaknesses in emission (volatile coating components) compared with Example 3 according to the invention and/or in the formation of the pore trace and/or resistance to chemicals. Comparative Example 12, which corresponds to DE 3,314,610, showed a clear smoke formation and, in addition to very poor resistance to chemicals, no sufficient pore trace under the same application conditions. Comparative Example 13, which corresponds to DE 4,001,672 shows, in addition to a significantly higher emission, volatile coating components in the form of smoke [lacuna] a pore trace which is not acceptable in practice.

We claim:

1. An aqueous coating composition for the coating of veneer films and continuous edges, including a coating component I, which comprises
   A) one or more resins selected from the group consisting of water-dilutable melamine resins, urea resins and mixtures thereof, and
   B) one or more hydroxyl-containing polyesters and a coating component II which contains an acid curing catalyst, the polyesters used as component B being obtained from a) 30 to 50 mol % of a mixture comprising
   $a_1$) 50 to 100 mol % of at least one saturated, aliphatic dicarboxylic acid,
   $a_2$) 0 to 50 mol % of at least one olefinically unsaturated, aliphatic dicarboxylic acid,
   $a_3$) 0 to 50 mol % of at least one aromatic dicarboxylic acid and
   $a_4$) 0 to 50 mol % of at least one diisocyanate and
b) 70 to 50 mol % of a mixture comprising
   $b_1$) 10 to 60 mol % of at least one glycol selected from the consisting of monomeric, and oligomeric glycols and mixtures thereof, having 2 to 4 C atoms per glycol segment and a number-average molecular weight of less than or equal to 200,
   $b_2$) 10 to 60 mol % of at least one diol having 4 to 10 C atoms per molecule, with the exception of the glycols used as component $b_1$,
   $b_3$) 0 to 70 mol % of at least one polyol having on average 3 to 6 OH groups per molecule and a number-average molecular weight of less than or equal to 1000, with the proviso that the sum of the proportions of components $a_1$ to $a_4$, the sum of the proportions of components $b_1$ to $b_3$, and the sum of the proportions of components a and b are in each case by themselves 100 mol %, and polyesters B have an OH number of 200 to 1000 mg of KOH/g.

2. An aqueous coating composition as claimed in claim 1, wherein the coating component I, comprises,
   A) 15 to 70% by weight of one or more resins selected from the group consisting of water-dilutable melamine resins, urea resins and mixtures thereof and
   B) 10 to 50% by weight of one or more hydroxyl-containing polyesters,
the percentages by weight given being in each case relative to the total weight of coating component I, and a coating component II, comprising 0.5 to 50% by weight, relative to the total weight of components A to C, of an acid curing catalyst.

3. An aqueous coating composition as claimed in claim 1, wherein the polyesters have been prepared from
   a) 30 to 40 mol % of dicarboxylic acid component a and
   b) 70 to 60 mol % of di- and polyol component b.

4. An aqueous coating composition as claimed in claim 1, wherein the dicarboxylic acid component comprises
   $a_1$) 70 to 100 mol % of component $a_1$,
   $a_2$) 0 to 30 mol % of component $a_2$,
   $a_3$) 0 to 30 mol % of component $a_3$ and
   $a_4$) 0 to 30 mol % of component $a_4$.

5. An aqueous coating composition as claimed in claim 1, wherein the compound selected from the group consisting of diol and polyol components and mixtures thereof comprises
   $b_1$) 20 to 45 mol % of component $b_1$,
   $b_2$) 20 to 45 mol % of component $b_2$ and
   $b_3$) 30 to 50 mol % of component $b_3$.

6. An aqueous coating composition as claimed in claim 1, wherein saturated aliphatic dicarboxylic acids having 4 to 10 C atoms are used as component $a_1$.

7. An aqueous coating composition as claimed in claim 1, wherein triethylene glycol is used as component $b_1$.

8. An aqueous coating composition as claimed in claim 1, wherein 1,4-dimethylolcyclohexane is used as component $b_2$.

9. An aqueous coating composition as claimed in claim 1, wherein polyols having on average 3 to 4 OH groups per molecule.

10. An aqueous coating composition as claimed in claim 1, which contain melamine/formaldehyde resins etherified with resins selected from the group consisting of methanol and urea resins and mixtures thereof, etherified with methanol as component A.

11. An aqueous coating composition as claimed in claim 1, wherein polyols having a number-average molecular weight of less than or equal to 400 are used as component $b_3$.

12. An aqueous coating composition as claimed in claim 9, wherein polyols having a number-average molecular weight of less than or equal to 400 are used as component $b_3$.

13. A veneer film or continuous edge, which is coated with an aqueous coating composition as claimed in claim 2.

14. An article comprising a veneer film or continuous edges as claimed in claim 13 glued onto chip- or hardboards.

15. A process for the coating of veneer films and continuous edges, in which
   I) an aqueous coating composition is applied which comprises a coating component I and a coating component II which are mixed directly before application,
   II) the resulting wet film is baked at a temperature between 90° and 200° C. for 8 to 50 s,
wherein the aqueous coating composition is as claimed in claim 2.

16. The process as claimed in claim 15, wherein, prior to step I, the process further comprises the step of printing the veneer with a printing ink containing a paint-repellant agent at the place where the paint film is supposed to be thinner than at the other places, then applying the aqueous coating composition, as defined in step I of claim 15, to obtain a three-dimensional surface structure.

17. The process of claim 16, further comprising the step of overcoating the resultant coating from steps I and II with one or more layers of paint.

* * * * *